July 10, 1962 D. D. DE FORD ETAL 3,043,127
THERMOCHROMATOGRAPHY HEATER
Filed Dec. 11, 1958 3 Sheets-Sheet 1

INVENTORS
D.D. DEFORD
B.O. AYERS
BY
*Hudson & Young*
ATTORNEYS

INVENTORS
D.D. DEFORD
B.O. AYERS
BY Hudson + Young
ATTORNEYS

INVENTORS
D.D. DEFORD
B.O. AYERS

United States Patent Office 3,043,127
Patented July 10, 1962

3,043,127
THERMOCHROMATOGRAPHY HEATER
Donald D. De Ford, Evanston, Ill., and Buell O. Ayers, Bartlesville, Okla., assignors to Phillips Petroleum Company, a corporation of Delaware
Filed Dec. 11, 1958, Ser. No. 779,677
13 Claims. (Cl. 73—23)

This invention relates to method and apparatus for making thermochromatographic separations and analyses. Specifically, this relates to an improvement in such methods and apparatus for heating in order to effect a desired separation preparatory to analysis.

In ordinary chromatographic analysis, a sample is placed in a column that comprises a conduit containing a body or mass of sorbent. By sorbent is meant a material which will either adsorb or absorb the sample, but the mechanism is primarily adsorption. The components of the mixture are then caused to separate (elute) in various ways, one of which includes flowing a carrier gas through the column. Elution of constituents of a given mixture in a given column takes place in a certain order, which is ordinarily predictable. In an ideal separation the constituents of the sample are eluted from the sorbent one at a time. A selected component in the sample can thus be separated and the sample can be analyzed therefor.

In thermochromatography the elution is aided by the application of heat to the sorbent having the mixture therein. It is known in this art that a linear temperature gradient, when established at the inlet portion of the column and moved along the column will cause equally spaced elutions of the respective constituents with respect to distance along the heated portion of the column. Preferably, this is done while flowing carrier gas into the column. The advantages of this technique include an increased rate of separation of the constituents and an improved accuracy of predicting the time at which these constituents will appear at the outlet of the column. Therefore, when we refer to thermochromatography we refer to the technique of applying a temperature gradient to a sorbent, and then causing it to travel along the sorbent.

There are numerous problems involved in the thermochromatographic technique, primarily the problem of establishing a perfectly linear temperature gradient. Deviations from linearity may give imperfect separation and destroy the time-predictability of the technique. Like chromatography itself it still involves the problem of getting an isolated sample of a selected constituent. Frequently, it is necessary to further separate the mixture in a second chromatographic column in order to isolate the desired constituent for further analysis.

The instant invention provides a means to isolate without having the problem inherent in the thermal technique of maintaining a perfectly linear temperature gradient. This is accomplished by establishing a preselected temperature differential which encompasses a range that includes the equilibrium temperature of the selected constituent. Once this temperature differential is established and moved along the column the selected constituent will elute or be fractionated and follow along within the limits of this temperature front. By causing the differential temperature to be applied over a very short linear space of the column a very steep temperature slope is achieved and by reason of the selected end points of the temperature, the linearity of the gradient is of no great consequence. This provides the advantages of sharper resolution, a simpler furnace and furnace controls, improved ability to concentrate trace components, and ability to compress, with respect to time or the column axis, the traditional peak obtained by the elution of a component, and eliminates the shift of time base due to the temperature sensitivity of chromatographic columns (those not using thermal means).

Accordingly, it is an object of this invention to provide an improved method and apparatus for making thermochromatographic separations. Another object is to provide method and apparatus for creating stepped temperature gradients along a thermochromatographic column. Another object is to provide method and apparatus to isolate one selected component and to move it through the column by means of this isolation which is accomplished by an appropriate differential temperature gradient. Similarly, a group of selected components may be so isolated. It is still another object to provide method and apparatus for compressing the peak of a selected component or of a selected group with respect to the length of the column or the time involved to elute it from the column by employing appropriate thermochromatographic means. Other objects and advantages will become obvious from the following disclosure.

Figure 1:
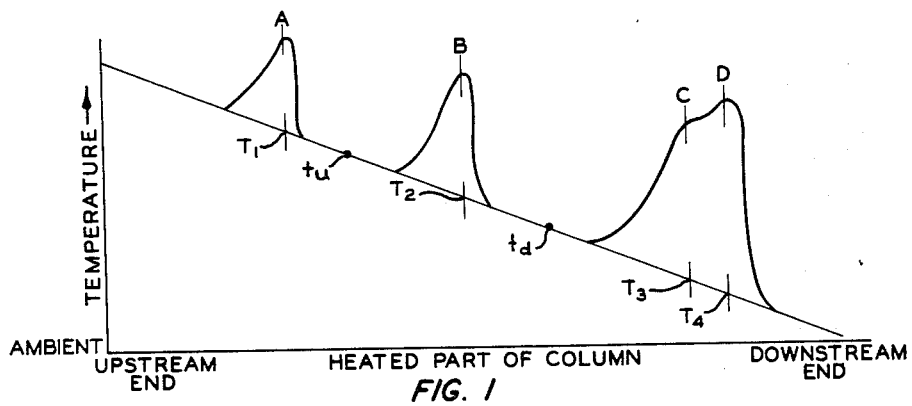
FIGURES 1, 2 and 5 show ideal (not actual) types of temperature gradients along a chromatographic column.

Referring now to FIGURE 1 there is shown a linear temperature gradient as established along a chromatographic column. The peaks A, B, C and D are representative of constituents in a mixture that separates along the temperature gradients at the respective equilibrium temperatures $T_1$, $T_2$, $T_3$ and $T_4$. It should be noted that the peaks C and D are representative of two constituents having poor resolution and therefore do not generate individual peaks upon being eluted from the column. These peaks may be generated by an apparatus which has a recorder which responds to measurements by means of a temperature sensitive bridge, infrared, ultraviolet, or even differential refractometer analyses of the eluted components.

The respective temperatures $T_1 \ldots T_4$ represent the equilibrium temperatures of their respective constituents A through D under the conditions existing in the column considering such parameters as velocity of the carrier gas, the velocity of the furnace which establishes the temperature gradient, the heat of the solution in the presence of the mass of sorbent, and characteristics of the gases in the mixture. The equilibrium temperature, for the purposes of this discussion, may be considered as that value on the temperature gradient curve which is intercepted by a vertical line through the peak or maximum value of a selected component. For a given set of conditions within a given column, the equilibrium temperature should be the same all the time, and that is what we so define by referring to equilibrium temperatures in the mass.

Figure 2:
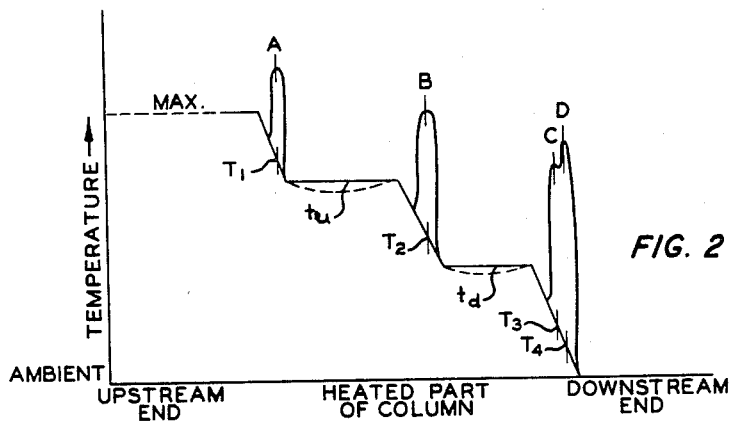

FIGURE 1 shows the typical manner in which a linear temperature gradient is used to elute components from a mixture. As mentioned above, this requires an extremely carefully built and controlled furnace to establish a perfectly linear temperature gradient. The temperature gradient of FIGURE 2 illustrates for comparison the temperature gradient and results thereof when employing the instant invention where, for example, it may be assumed that it is desired to separate component B from the four component mixture of A, B, C and D. In order to do this the various column parameters must be known and established within the column so that the corresponding equilibrium temperatures of the respective components can be established. Once this is accomplished then the equilibrium temperature and elution peak of B are bracketed by selected upstream and downstream temperatures, $t_u$ and $t_d$, which respectively fall intermediate the equilibrium temperatures in the mass of the selected component and those constituents of the mixture that desorb immediately after and immediately before the selected component, or group of components, desorb. Since the temperature gradient between $t_u$ and $t_d$ covers only a small length of the column, we have discovered that it is not necessary that a perfectly linear change from one to the other be accomplished nor is it essential that a perfectly linear and constant temperature (solid lines through $t_u$ and $t_d$) be maintained between the various temperature steps of FIGURE 2 (dotted lines). However, straight line portions are shown for the sake of simplicity.

The advantage of using a selected temperature and selected temperature differentials and applying them over a very short section of the column should now be evident from FIGURE 2. In the first place, the selected component can be isolated from other components within the column. Next, the peak is compressed, thereby requiring less time to elute any one particular component, hence to elute all components. As a corollary to this the measurement of one or all components can be accomplished more rapidly by reason of not having to measure over an extended time period. The temperatures $t_u$ and $t_d$ should be selected so that they keep the leading and trailing edges of the peak on the slope which includes $T_2$. This is so that there will be no sliding of the peak of the selected component from one temperature step over into the next one, as discussed with respect to FIGURE 5.

Figure 3:
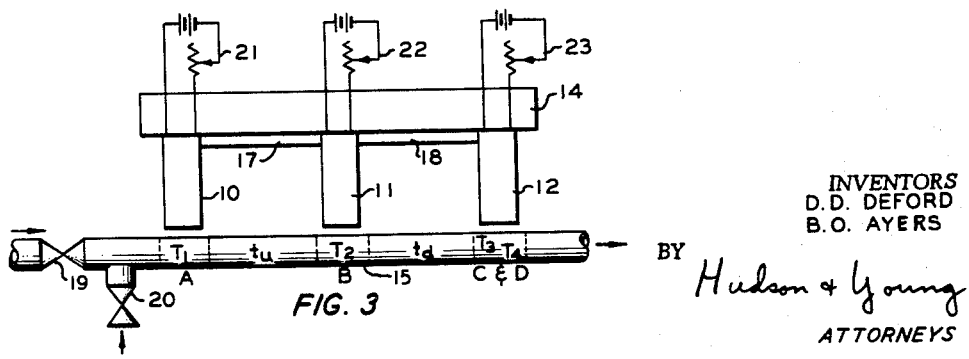
FIGURES 3 and 6 show schematically various means for obtaining certain of these temperature gradients.

FIGURE 3 shows schematically apparatus for achieving the temperature steps of FIGURE 2. Heat transfer means much as heaters 10, 11 and 12 are mounted on a support 14 and moved in unison along a column 15 to establish the various temperature gradients of FIGURE 2. If desired, appropriate thermal insulation is applied between the heaters at 17 and 18. The valves 19 and 20 are situated at the inlet of the column and can be either manually or automatically operated to supply measured samples of the mixture to be analyzed and carrier gas, respectively, to the interior of the column. Individual heat controls 21, 22 and 23 are supplied for the respective heaters 10, 11 and 12. Electrical resistance heaters are preferred. The individual controls permit setting the desired temperature gradients as selected along the column. Although only three heaters are shown, it should be evident that any desired number can be selected for making a separation into a desired group of components.

Figure 4:
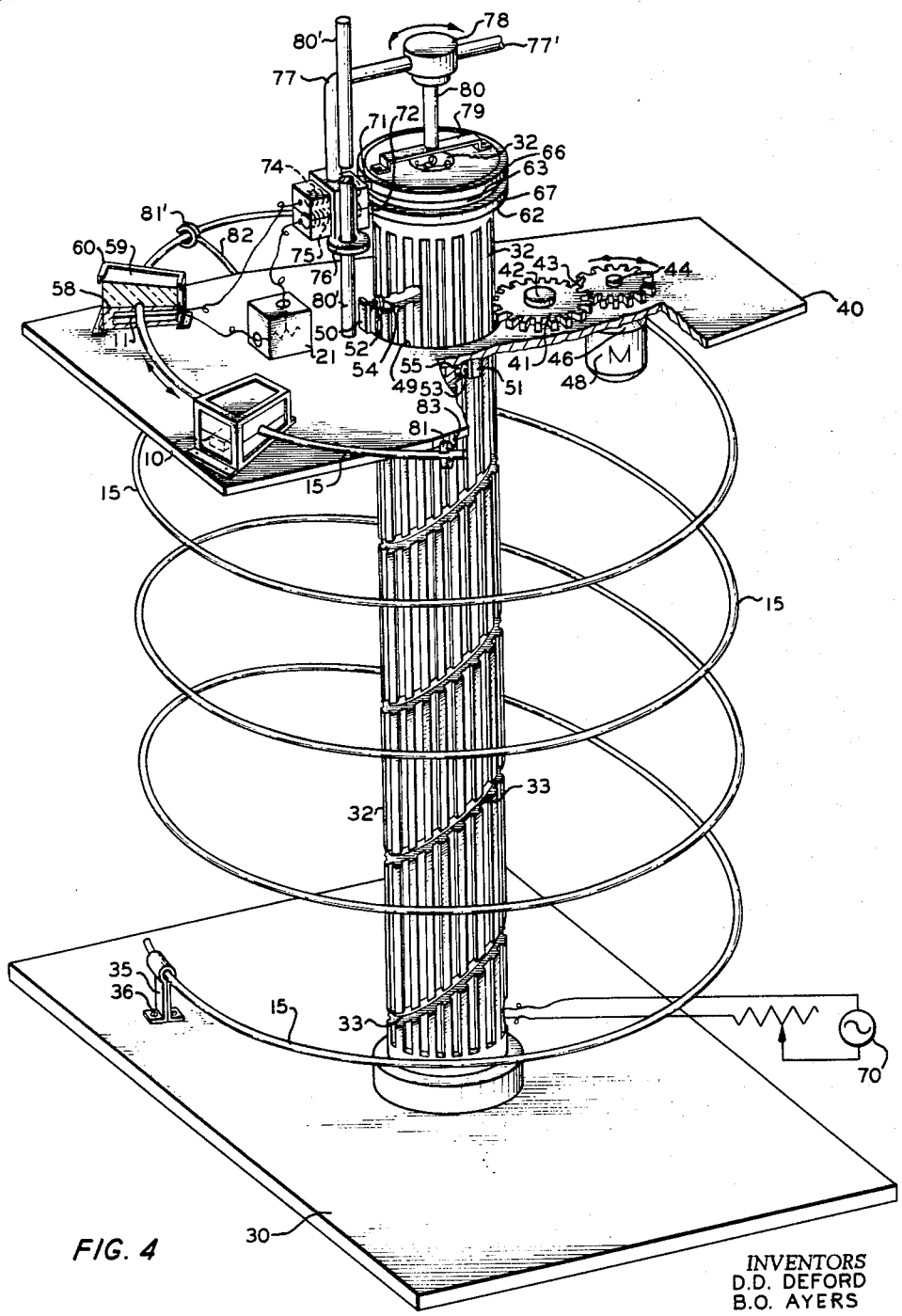
FIGURE 4 is an isometric view of one embodiment of an apparatus by which such temperature gradients are established and moved along the column. Throughout the drawings like elements are referred to by like reference numerals, and primed numbers represent modifications thereof.

In FIGURE 4 is shown one embodiment for applying heat and forming a stepped temperature gradient such as shown in FIGURE 2. A base 30 provides a support in which a splined shaft 32 is fixedly mounted. The shaft has a helical cam surface, groove 33, therein. In addition a support bracket 35 supports one end of the column 15 and is likewise secured by means such as a bolt 36 to the base. Similar means, not shown, are provided for the other end of the column.

The column 15 is formed in helical form and the mechanism hereinafter described is for moving the heater along the helical column. A turntable 40 has an idler gear 41 which engages the spliced shaft 32 and is secured to 40 by a shaft 42 and receives power from a pinion 43 which is mounted on the shaft 44 out of the gear box 46. A motor 48 drives the pinion through the gear box. The motor and gear box may be purchased commercially as a unit and secured by suitable means to the turntable 40. The kinematic chain 46 through 32 may be defined as a gear train. A hole 49 in the turntable 40 surrounds the column 32. Adjacent this hole and separated 180 degrees from each other are respective support members 50 and 51, supporting therefrom, respectively, axles 52 and 53 on which are mounted cam followers, i.e. rollers 54 and 55 which engage the helical groove 33 thereby to guide the turntable as it moves up the column when driven by the electric motor 48.

At the opposite end of the turntable and preferably mounted so as to counterbalance the gear motor 46, 48, is mounted a heat transfer means, e.g. heater 10. Preferably the heater is mounted in one of two graphite blocks 58 and 59 so that it may be in thermal contact therewith and so that the graphite blocks may act as guide, a heat conductor, and a lubricating means when in contact with the column 15 which moves in a shaped hole (see FIGURE 4) through the two respective blocks 58 and 59. The blocks of graphite or, if desired, of copper or aluminum, are secured to each other, as by a spring held in tension between a pin protruding from each block and are loosely mounted in a frame 60 (secured by screws to turntable 40) so that they may move the requisite small amounts necessary to maintain contact with the column without binding the mechanism and stopping the movement of the heater therealong.

At the top of the shaft 32 is a layer of electrical insulation 62 and a second layer of insulation 63 which separate the commutator elements 66 and 67 from each other. Either alternating or direct current is supplied from a source 70 to the latter which transmit electricity for heating through the brushes 71 and 72 and the control 21 to the heater. The brushes are preferably T-shaped pieces of graphite held by springs 74 and 75 in contact with their respective commutators. These assemblies are mounted in a shaped member 76 of insulating material which is mounted on a support arm 77 that rotates on bearing 78 with respect to the shaft 32. Bearing 78 is secured to the shaft by an insulating bracket 79 and vertical spacer 80. Guide rod 80' maintains the positional relation of the brushes to the turntable. A similar construction is supported on arm 77' to power the motor 48. The individual heat control 21 is shown schematically and is also secured to the turntable. Bifurcated members 81' and 81 are supported from the turntable by means of arms 82 and 83 to provide support for the column and to aid in guiding it through the contact blocks 58 and 59.

Figure 5:
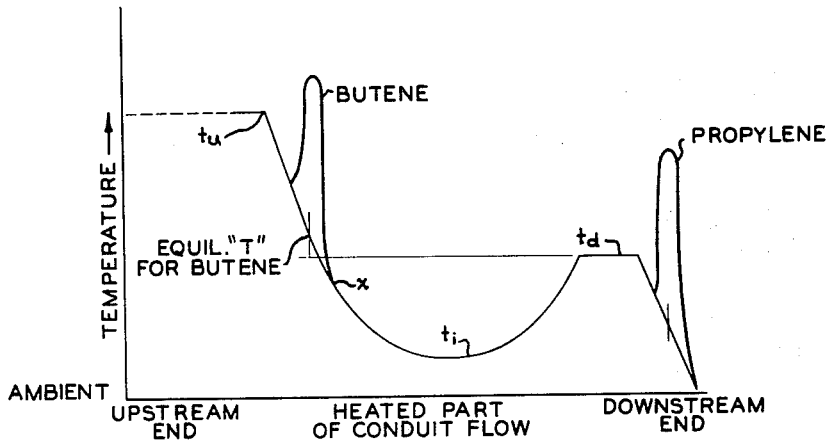
Figure 6:
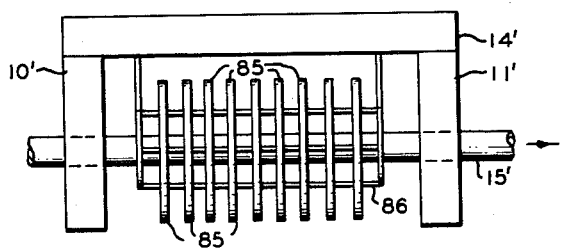

FIGURE 6 shows the details of a modification of the apparatus of FIGURES 3 through 5 which provides the temperature gradient of the nature shown in FIGURE 5. Here it is desired to provide a relatively sharp temperature drop between the downstream heater 11' and the upstream heater 10' by providing a means for removing heat, such as a group of cooling fins 85, in thermal contact with the column 15'. This may be done by forming a wire-shaped structure 86 and mounting the fins thereon, 86 being supported in turn on the member 14' which could, for example, be the turntable 40 of FIGURE 4. The reason for providing a region having a sufficiently low intermediate temperature $t_i$, as shown in FIGURE 5, is that in separating certain materials such as butene in the presence of propylene, the tendency of butene to slide out of its temperature gradient into the propylene temperature gradient is diminished by cooling the column to the point where the butene is resorbed prior to being heated to its equilibrium temperature. This keeps the butene in place and permits improved resolution by means of the instant invention. The tendency of the butene to so slide or slip out of place is denoted by the portion X of the butene peak which lies below $t_d$.

The column 15 may be filled with a sorbent such as silica gel, charcoal molecular sieve, crushed firebrick or diatomaceous earth and, in addition, may have a liquid sorbent supported thereon. This forms the sorbent mass which sorbs, primarily by adsorption, the sample that is admitted through the valve 19. Carrier gas is admitted during both sorption and the subsequent elution through a separate connection adjacent the inlet (not shown). This gas may comprise helium, argon, nitrogen or other similar inert gases. Dead spaces are provided at the inlet and outlet of the column so that the temperature gradients can be established and maintained during the terminal parts of an elution cycle thus avoiding on-off operation and the inconvenience of warming up the heaters when repeating the cycle. The column preferably is made of copper or stainless steel. If desired, in order to aid thermal conductivity within the column, powdered metal may be added to the sorbent. Analyzing apparatus may comprise a direct current bridge having a temperature cell that includes one branch of the bridge disposed at the inlet of the column to measure the incoming carrier gases in order to provide a reference signal, and a second temperature cell of another branch of the bridge disposed at the outlet. These respective branches of the bridge are preferably thermistors. The unbalance created in the bridge by the cooling effect of different gases flowing past the thermistors within the cells operates a recorder which in turn generates a series of peaks, each of which provides an index of the quantity of a constituent in the mixture. The motor 48 is preferably a shaded pole or a synchronous motor and may be supplied with power in the same manner as the heater 10 is, i.e., through the commutator and brush arrangement such as shown in FIGURE 4. Timing switches may be used to automatically operate the valves and to reverse the travel of the heater so that it can be returned to its initial position for the next cycle.

The operation of the apparatus of FIGURE 4 is as follows. It is first necessary to adjust the respective heaters 10, 11 and any others which may be added both by setting their various rheostats 21, 22, 23, etc. (see FIGURE 3) and by adjusting their spacing along the column. This will provide the proper horizontal, or approximately horizontal, temperature steps as shown in FIGURE 2. Then the inlet valve, such as 19 of FIGURE 3 (not shown in FIGURE 4) is open for a predetermined time to place a measured sample within the column 15. Carrier gas is started through valve 20 and the motor 48 then begins to move the heater or heaters along the column. As the motor turns the pinion 43, power is applied through the gear train to the splines of the column 32. This causes turntable 40 to rotate and the helical grooves 33 cause the turntable to advance the heaters along the column (assuming the inlet to be at the lower end of the helix 15) at a predetermined rate. This continues until the furnace, i.e., the assembly of heaters, such as 10 and 11 of FIGURE 4, has reached the dead space at the outlet end of the column. At this time the gear motor 48 can be turned off, or its polarity can be reversed to run the heater back down the column. If time is of the essence in repeating the operation, it may be desirable to have the motor trip an automatic mechanism to shift gears thereby to move it back down at a higher speed.

As the heaters move along the column a temperature gradient generally of the shape of FIGURE 2 is provided. If a component having an intermediate equilibrium temperature, such as B of FIGURE 2, is the selected component—the one that it is desired to analyze for—it will travel along the column in the general proximity of the heater 11 if three heaters (preferred for such intermediates) are employed as shown in FIGURE 3. Two heaters can best be employed to separate binary mixtures, or to isolate the lightest or the heaviest (first and last to elute, respectively) components from other mixture. In all cases it is preferred technique to adjust the upstream heater so that the maximum column temperature, as shown in FIGURE 2, is made sufficient to elute even the constituent of lowest volatility out of the column at the same rate as, but behind, the selected component. In any event, by employing the instant apparatus it is possible to isolate one or a group of components.

*Example*

A sample having approximately equal proportions of propylene, butene-1, and pentane-1 is admitted to a column filled with silica gel. Helium is admitted to a column filled with silica gel. Helium is admitted as the carrier gas and flows through the column at a velocity of 12.9 cm./sec. (computed on the basis of free space between the silica gel particles). The furnace, at an upstream temperature of 400° K. is advanced along the column at a velocity of 2 cm./sec. (furnace was 25 cm. long and downstream temperatures was 300° K.).

Under these conditions, the equilibrium temperatures of the constituents in the sample are:

Propylene _____ 335° K.
Butene-1 _____ 355° K.
Pentane-1 _____ 375° K.

The peak maxima under these conditions are separated by 5 cm. or 2.5 seconds, a temperature gradient of 4° K./cm. having been maintained by the furnace.

A longer furnace is provided and a temperature gradient of 2° K./cm. is established. Under the above furnace and carrier gas conditions in the same column, the equilibrium temperatures are determined to be the same, but the peak maxima are separated by 10 cm. and the peaks themselves have a broader time base.

A ring heater is provided having 4 electrical resistance heaters spaced at 8.3 cm. intervals along the column. The heaters are adjusted to arbitrarily selected values as follows:

(1) Downstream heater _____ 300° K.
 (to remove all trace materials having lower equilibrium temperatures)
(2) Downstream intermediate heater _____ 345° K.
(3) Upstream intermediate heater _____ 365° K.
(4) Upstream heater _____ 400° K.
(All temperatures are those within the column, i.e. in the packing).

The column is exposed to ambient conditions in the intervals between the heaters. The above furnace and carrier gas velocities are repeated. Equilibrium temperatures are the same as above. The peaks are noted to follow the respective heaters, and due to the localized heating effect of each heater and the discontinuous temperature gradient, the peaks are compressed along their time axis and the maxima are sharper. The peaks are not equally spaced due to the non-linearity of the temperature gradient.

If desired, of course, the apparatus as shown in FIGURE 6 may be mounted on the turntable 40 of FIGURE 4. This is employed in order to improve the resolution of components that are difficult to separate as explained above with reference to butene and propylene.

It should be evident from the foregoing that we have improved thermochromatographic methods and apparatus by providing a means for establishing a desired temperature gradient in a localized portion of a thermochromatographic column. This, in turn, offers the advantage of eliminating the problem of perfect linearity of temperature gradient by relying on a differential temperature that brackets the key component equilibrium temperature and thus compresses the peak or peaks of various components causing them to elute faster and at a more predictable time than does prior art apparatus. This is accomplished by providing a plurality of heaters spaced along the column to give the desired temperature gradients and providing each heater with an individual control so that it can be individually set to accommodate the condition desired. Individual components, or groups thereof, can be thus isolated. In the case of groups the downstream temperature is below that of the most volatile constituent in the group, i.e. the first constituent in the group to desorb from the mass or to be eluted and the upstream temperature is selected to be above the least volatile constituent in the group, i.e. the last one to elute or desorb.

When we refer to equilibrium temperature or equilibrium temperature in the mass, we refer to the above-defined temperature in a given column, with a given sorbent while the parameters of carrier gas velocity and heater velocity are held at preselected levels.

While we have shown our invention with respect to certain specified apparatus, it is not our intention nor our purpose to limit ourselves to that apparatus in its practice. It is our intention to include as our invention all those equivalents and modifications thereof which would be obvious to one skilled in the art.

We claim as our invention:

1. A thermochromatographic apparatus comprising a column constructed from a conduit filled with sorbent, said conduit having an inlet port and an outlet port, means for continuously introducing a carrier gas into said column through said inlet port, means for introducing a discrete amount of sample into said column through said inlet port at predetermined times, a sample cell, means for passing the effluent from said column through said sample cell, means in said sample cell for producing a signal representative of the composition of said effluent, a first means disposed in heating relationship with said column for establishing a first temperature gradient by heating said column, second means disposed in heating relationship with said column for establishing a second temperature gradient by heating said column, the lowest temperature of said second temperature gradient being at least as high as the highest temperature of said first temperature gradient, said second means being spaced along said column from said first means; and means for moving said first means ahead of said second means along said conduit from said inlet port toward said outlet port of said conduit and for moving said first and second spaced means in unison along said column while maintaining the same in heating relationship with said column thereby to move two spaced temperature gradients along said column and to isolate within each temperature gradient a component of a sample within said column in equilibrium with said sorbent and having an equilibrium temperature on said sorbent that is within the respective temperature gradients.

2. A thermochromatographic apparatus comprising a conduit, means for passing a carrier gas through said conduit from one end thereof to the other end thereof, means for introducing a sample of a material to be analyzed into said conduit, a first means for heating disposed in thermal transferring relationship with said conduit for establishing a first temperature in said conduit, a second means for heating disposed in thermal transferring relationship with said conduit for establishing a second temperature in said conduit, said second temperature being greater than said first temperature, said second means being spaced along said conduit from said first means, means for moving said first means ahead of said second means along said conduit from said one end thereof to the other end thereof and for moving said first and second means in unison along said conduit, a sample cell, and means for passing the effluent from said conduit through said sample cell.

3. The apparatus of claim 2 further including first and second means for selectively adjusting, respectively, the heating effect of said first and second means for heating.

4. The apparatus of claim 2 further including means disposed in thermal transferring relationship with said conduit between said first and second means, for removing heat from said conduit.

5. A thermochromatographic apparatus comprising a column constructed from a conduit filled with a sorbent; means for passing a carrier gas through said conduit from one end thereof to another; means for introducing a sample of the material to be analyzed into said conduit; first means for establishing a first temperature gradient in said sorbent by heating a portion of said column and disposed in heating relationship with said column; second means for establishing a second temperature gradient in said sorbent by heating a portion of said column and disposed in heating relationship with said column, said second means being spaced along said column from said first means; said second temperature gradient having a minimum temperature at least as high as the maximum temperature of said first temperature gradient; and means for moving said first means ahead of said second means along said conduit from said one end thereof to the other end thereof and for moving said first and second spaced means in unison along said column while maintaining the same in heating relationship with said column thereby to move two spaced temperature gradients along said column and to isolate within each temperature gradient a component of a sample within said column in equilibrium with said sorbent and having an equilibrium temperature on said sorbent that is within the respective temperature gradients.

6. A method of effecting thermochromatographic analysis of a mixture comprising forming a mass of sorbent surrounded by a conduit, passing a sample of a mixture to be analyzed into the mass thus formed, flowing a carrier gas through said mass from one end thereof to the other end thereof, positioning first and second heating means in thermal transferring relationship with said conduit and spaced apart along said conduit to establish first and second spaced temperature gradient zones in said mass, said second temperature gradient zone having a minimum temperature at least as high as the maximum temperature of said first temperature gradient zone, moving said first heating means ahead of and in unison with said second heating means along said conduit from said one end thereof to the other end thereof, establishing a sampling zone, passing the effluent from said conduit through said sampling zone, and establishing a signal representative of a characteristic of a material passing through said sampling zone.

7. The method of claim 6 wherein the maximum temperature of said first temperature gradient zone is intermediate the respective equilibrium temperatures in the mass of the selected component and that constituent of the mixture which desorbs from the mass immediately before the selected component desorbs.

8. The method of claim 6 wherein the maximum temperature of said second temperature gradient zone is intermediate the respective equilibrium temperature in the mass of the selected component and that constituent of the mixture which desorbs from the mass immediately after the selected component desorbs.

9. The method of claim 6 wherein the maximum temperature of said first temperature gradient zone is intermediate the equilibrium temperature in the mass of the selected component and that constituent of the mixture which desorbs from the mass immediately before the selected component desorbs; and wherein the maximum temperature of said second temperature gradient zone is intermediate the equilibrium temperatures in the mass of the selected component and that constituent of the mixture which desorbs from the mass immediately after the selected component desorbs.

10. The method of claim 6 further comprising the step of maintaining between said first and second temperature zones a region having a temperature lower than the maximum temperature of the downstream one of said first and second temperature gradient zones and also lower than the minimum temperature at the upstream one of said first and second temperature gradient zones.

11. A method of effecting a thermochromatographic analysis of a selected component in a mixture, comprising forming a mass of sorbent surrounded by a conduit, passing a sample of a mixture into the mass thus formed, flowing a carrier gas through said mass from one end thereof to the other end thereof, positioning first and second heating means in thermal transferring relationship with said conduit to thereby establish first and second spaced temperature gradient zones in said mass, said second temperature gradient zone having a minimum temperature at least as high as the maximum temperature of said first temperature gradient zone, moving said first heating means ahead of and in unison with said second heating means along said conduit from said one end thereof to the other end thereof while maintaining said first and second heating means spaced one from the other, establishing a sampling zone, passing the effluent from said conduit through said sampling zone, and establishing a signal representative of a characteristic of the material passing through said sampling zone.

12. A method of analyzing a fluid mixture for a selected group of the constituents thereof having their equilibrium temperatures in the presence of a sorbent, within a predetermined range comprising the steps of surrounding a mass or sorbent with a conduit, passing a sample of the mixture to be analyzed into said mass, flowing a carrier gas through said mass from one end thereof to the other end thereof, positioning first and second heating means in thermal transferring relationship with said conduit to establish first and second temperature gradient zones spaced apart along said conduit, said first temperature gradient zone having a maximum temperature less than the lowest equilibrium temperature in the mass of a constituent in the selected group and said second temperature gradient zone having a maximum temperature greater than the highest equilibrium temperature in the mass of a constituent in the selected group, moving said first heating means ahead of and in unison with said second heating means along said conduit in the direction of the flow of said carrier gas, establishing a sampling zone, passing the effluent from said conduit through said sampling zone, and establishing a signal representative of a characteristic of the material passing through said sampling zone.

13. The method of analyzing a fluid mixture for a selected group of the constituents thereof having their equilibrium temperatures in the presence of a sorbent, within a predetermined range comprising the steps of surrounding a mass or sorbent with a conduit, passing a sample of the mixture to be analyzed into said mass, flowing a carrier gas through said mass from one end thereof to the other end thereof, positioning first and second heating means in thermal transferring relationship with said conduit to establish first and second temperature gradient zones spaced apart along said conduit, said first temperature gradient zone having a maximum temperature less than than the equilibrium temperature in the mass of that constituent in the selected group that elutes first but greater than the equilibrium temperature of that constituent of the mixture that desorbs from the sorbent immediately before the first-eluting constituent in the selected group desorbs and said second temperature gradient zone having a maximum temperature greater than the highest equilibrium temperature in said mass of the last constituent in the selected group to elute but less than that constituent of the mixture that desorbs from the sorbent immediately after said last constituent in the selected group elutes, moving said first heating means ahead of and in unison with said second heating means along said conduit, establishing a sampling zone, passing the effluent from said conduit through said sampling zone, and establishing a signal representative of a characteristic of the material passing through said sampling zone.

References Cited in the file of this patent

UNITED STATES PATENTS

| | | |
|---|---|---|
| 1,661,104 | Barnebey | Feb. 28, 1928 |
| 2,083,732 | Moore et al. | June 15, 1937 |
| 2,398,817 | Turner | Apr. 23, 1946 |
| 2,519,874 | Berg | Aug. 22, 1950 |
| 2,764,253 | Weber | Sept. 25, 1956 |
| 2,777,782 | Sheffer et al. | Jan. 15, 1957 |